United States Patent
Jing et al.

(10) Patent No.: US 7,060,738 B2
(45) Date of Patent: *Jun. 13, 2006

(54) POLYMER ELECTROLYTES CROSSLINKED BY ULTRAVIOLET RADIATION

(75) Inventors: Naiyong Jing, Woodbury, MN (US); Steven J. Hamrock, Stillwater, MN (US); Michael A. Yandrasits, Hastings, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/733,211

(22) Filed: Dec. 11, 2003

(65) Prior Publication Data

US 2005/0131097 A1 Jun. 16, 2005

(51) Int. Cl.
C08F 2/46 (2006.01)

(52) U.S. Cl. .................. 522/187; 522/184; 522/185; 522/186; 522/150; 522/155; 522/156

(58) Field of Classification Search ............ 522/1, 522/2, 150, 155, 156, 184, 185, 186, 187, 522/188, 189
See application file for complete search history.

(56) References Cited

U.S. PATENT DOCUMENTS

| | | | |
|---|---|---|---|
| 3,282,875 A | 11/1966 | Connolly et al. | |
| 3,635,926 A | 1/1972 | Gresham et al. | |
| 3,784,399 A | 1/1974 | Grot | |
| 3,853,828 A | 12/1974 | Wall et al. | |
| 4,000,356 A | 12/1976 | Weisgerber et al. | |
| 4,073,752 A | 2/1978 | Ramp | |
| 4,169,023 A | 9/1979 | Sata et al. | |
| 4,214,060 A | 7/1980 | Apotheker et al. | |
| 4,218,542 A | 8/1980 | Ukihashi et al. | |
| 4,230,549 A | 10/1980 | D'Agostino et al. | |
| 4,242,498 A | 12/1980 | Frosch et al. | |
| 4,268,650 A | 5/1981 | Rose | |
| 4,281,092 A | 7/1981 | Breazeale | |
| 4,330,654 A | 5/1982 | Ezzell et al. | |
| 4,334,082 A | 6/1982 | Resnick | |
| 4,391,844 A | 7/1983 | Baczek et al. | |
| 4,414,159 A | 11/1983 | Resnick | |
| 4,440,917 A | 4/1984 | Resnick | |
| 4,454,247 A | 6/1984 | Resnick | |
| 4,470,889 A | 9/1984 | Ezzell et al. | |
| 4,508,603 A | 4/1985 | Ukihashi et al. | |
| 4,602,045 A | 7/1986 | Markus et al. | |
| 4,686,024 A | 8/1987 | Scherer, Jr. et al. | |
| 4,734,474 A | 3/1988 | Hamada et al. | |
| 4,743,419 A | 5/1988 | Bierschenk | |
| 4,755,567 A | 7/1988 | Bierschenk et al. | |
| 4,981,932 A | 1/1991 | Blaise et al. | |
| 5,260,351 A | 11/1993 | Logothetis | |
| 5,264,508 A | 11/1993 | Ishibe et al. | |
| 5,330,626 A | 7/1994 | Banerjee | |
| 5,466,930 A | 11/1995 | Schlenoff | |
| 5,527,861 A | 6/1996 | Logothetis | |
| 5,608,022 A | 3/1997 | Nakayama et al. | |
| 5,693,748 A | 12/1997 | Ikeda et al. | |
| 5,795,496 A | 8/1998 | Yen et al. | |
| 5,798,417 A | 8/1998 | Howard, Jr. | |
| 5,804,650 A | 9/1998 | Tsuda et al. | |
| 5,852,148 A | 12/1998 | Behr et al. | |
| 5,986,012 A | 11/1999 | Legare et al. | |
| 6,011,074 A | 1/2000 | Sorenson et al. | |
| 6,090,895 A | 7/2000 | Mao et al. | |
| 6,224,994 B1 | 5/2001 | Asukabe et al. | |
| 6,225,368 B1 | 5/2001 | D'Agostino et al. | |
| 6,242,123 B1 | 6/2001 | Nezu et al. | |
| 6,248,469 B1 | 6/2001 | Formato et al. | |
| 6,254,978 B1 | 7/2001 | Bahar et al. | |
| 6,255,370 B1 | 7/2001 | Vizcaino et al. | |
| RE37,307 E | 8/2001 | Bahar et al. | |
| 6,274,677 B1 | 8/2001 | Tatemoto | |
| 6,277,512 B1 | 8/2001 | Hamrock et al. | |

(Continued)

FOREIGN PATENT DOCUMENTS

DE 26 24 203 12/1976

(Continued)

OTHER PUBLICATIONS

Gab-Jin Hwang:et al.; "Preparation Of Cation Exchange Membrane As A Separator For The All-Vanadium Redox Flow Battery", Journal of Membrane Science, Elsevier Scientific Publ. Company, Amsterdam, NL, vol. 120, No. 1, Oct. 30, 1996, pp. 55-67.

(Continued)

Primary Examiner—James J. Seidleck
Assistant Examiner—Sanza L. McClendon
(74) Attorney, Agent, or Firm—Philip Y. Dahl

(57) ABSTRACT

A method is provided for making a crosslinked polymer electrolyte, typically in the form of a membrane for use as a polymer electrolyte membrane in an electrolytic cell such as a fuel cell, as well as the polymer so made, the method comprising application of ultraviolet radiation to a highly fluorinated fluoropolymer comprising: a backbone derived in part from tetrafluoro-ethylene monomer, first pendent groups which include a group according to the formula —$SO_2$X, where X is F, Cl, Br, OH or —$O^-M^+$, where $M^+$ is a monovalent cation, and second pendent groups which include Br, Cl or I. Typically, the membrane has a thickness of 90 microns or less, more typically 60 or less, and most typically 30 microns or less.

16 Claims, No Drawings

U.S. PATENT DOCUMENTS

| | | |
|---|---|---|
| 6,355,370 B1 | 3/2002 | Katoh et al. |
| RE37,656 E | 4/2002 | Bahar et al. |
| 6,365,769 B1 | 4/2002 | Behr et al. |
| 6,380,337 B1 | 4/2002 | Abe et al. |
| RE37,701 E | 5/2002 | Bahar et al. |
| 6,387,964 B1 | 5/2002 | D'Agostino et al. |
| 6,423,784 B1 | 7/2002 | Hamrock et al. |
| 6,426,397 B1 | 7/2002 | Armand et al. |
| 6,462,228 B1 | 10/2002 | Dams |
| 6,498,216 B1 | 12/2002 | Cheng |
| 6,503,378 B1 | 1/2003 | Fisher |
| 6,552,135 B1 | 4/2003 | Schnurnberger et al. |
| 6,624,328 B1 | 9/2003 | Guerra |
| 6,649,703 B1 | 11/2003 | Michot et al. |
| 6,667,377 B1 | 12/2003 | Feiring et al. |
| 6,670,424 B1 | 12/2003 | Michot et al. |
| 6,872,781 B1 | 3/2005 | Hedhli et al. |
| 2002/0014405 A1 | 2/2002 | Arcella et al. |
| 2002/0040106 A1 | 4/2002 | Wlassics et al. |
| 2003/0032739 A1 | 2/2003 | Kerres et al. |
| 2003/0092940 A1 | 5/2003 | Hamrock |
| 2003/0181572 A1 | 9/2003 | Tan et al. |
| 2003/0181615 A1 | 9/2003 | Ameduri et al. |
| 2003/0208014 A1 | 11/2003 | Kerres et al. |
| 2004/0241518 A1 | 12/2004 | Yang |
| 2005/0096442 A1 | 5/2005 | Thaler et al. |
| 2005/0107488 A1* | 5/2005 | Yandrasits et al. .......... 522/156 |
| 2005/0107489 A1 | 5/2005 | Yandrasits et al. |
| 2005/0107490 A1* | 5/2005 | Yandrasits et al. .......... 522/156 |
| 2005/0107532 A1 | 5/2005 | Guerra et al. |
| 2005/0113528 A1 | 5/2005 | Jing et al. |
| 2005/0131096 A1 | 6/2005 | Jing et al. |
| 2005/0131097 A1 | 6/2005 | Jing et al. |
| 2005/0137351 A1 | 6/2005 | Guerra |

FOREIGN PATENT DOCUMENTS

| | | |
|---|---|---|
| DE | 26 38 791 | 3/1977 |
| DE | 100 21 104 A1 | 11/2001 |
| EP | 0 048 964 A2 | 4/1982 |
| EP | 407 937 | 1/1994 |
| EP | 0 422 231 B1 | 12/1995 |
| EP | 1 085 038 A1 | 3/2001 |
| EP | 1 091 435 A1 | 4/2001 |
| EP | 1 179 548 A1 | 2/2002 |
| EP | 1 238 999 A1 | 9/2002 |
| EP | 1 359 142 A1 | 11/2003 |
| FR | 2 387 260 | 12/1976 |
| GB | 1184321 | 3/1970 |
| JP | 53-29291 | 3/1978 |
| JP | 53-97988 | 8/1978 |
| JP | 53-134088 | 11/1978 |
| JP | 54-052690 | * 4/1979 |
| JP | 54-52690 | 4/1979 |
| JP | 56-72002 | 6/1981 |
| JP | SHO 60-250009 | 12/1985 |
| JP | SHO 62-288617 | 12/1987 |
| JP | 64-3140 | 1/1989 |
| JP | 5-314960 | 11/1993 |
| JP | 8-239494 | 9/1996 |
| JP | 2000-119420 | 4/2000 |
| JP | 2000-268834 | 9/2000 |
| JP | 2001-29800 | 2/2001 |
| JP | 2001-176524 | 6/2001 |
| JP | 2001-354641 | 12/2001 |
| JP | 2002-003466 | 1/2002 |
| JP | 2002-313364 | 10/2002 |
| WO | WO 94/03503 | 2/1994 |
| WO | WO 97/17381 | 5/1997 |
| WO | WO 99/38897 | 8/1999 |
| WO | WO 00/52060 | 9/2000 |
| WO | WO 01/27167 A1 | 4/2001 |
| WO | WO 01/87992 A2 | 11/2001 |
| WO | WO 01/96268 A2 | 12/2001 |
| WO | WO 02/50142 A1 | 6/2002 |
| WO | WO 02/062749 A1 | 8/2002 |
| WO | WO 02/087001 A2 | 10/2002 |
| WO | WO 02/103834 A1 | 12/2002 |
| WO | WO 03/004463 A1 | 1/2003 |
| WO | WO 03/022892 A2 | 3/2003 |

OTHER PUBLICATIONS

U.S. Appl. No. 10/325,278, filed Dec. 19, 2002; Polymer Electrolyte Membrane.

Kirk-Othmer, *Encyclopedia of Chemical Technology*, 3d ed., vol. 10, (1980), pp. 840-851.

* cited by examiner

POLYMER ELECTROLYTES CROSSLINKED BY ULTRAVIOLET RADIATION

FIELD OF THE INVENTION

This invention relates to a method of making a crosslinked polymer electrolyte, typically in the form of a membrane for use as a polymer electrolyte membrane in an electrolytic cell such as a fuel cell, by application of ultra violet radiation to a highly fluorinated fluoropolymer comprising: a backbone derived in part from tetrafluoroethylene monomer, first pendent groups which include a group according to the formula —$SO_2X$, where X is F, Cl, Br, OH or —$O^-M^+$, where $M^+$ is a monovalent cation, and second pendent groups which include Br, Cl or I.

BACKGROUND OF THE INVENTION

U.S. Pat. No. 4,470,889 purportedly discloses an electrolytic cell separated into an anode chamber and a cathode chamber by a fluorinated polymer membrane; where the membrane comprises: (a) at least 60 mole percent [CFX—$CF_2$] where X=F or Cl; (b) an ion exchange equivalent weight of at least 600; (c) pendant sulfonyl ion exchange groups; and (d) pendant substantially fluorinated carbon groups which have no ion exchange functionality. The pendant substantially fluorinated carbon groups which have no ion exchange functionality may comprise Br.

U.S. Patent Pub. No. US 2003/0181615 A1 purportedly discloses polymers of certain fluorosulfonated fluoromonomers, certain brominated fluoromonomers, and no tetrafluoroethylene (TFE) monomer. ('615 at para. 234 and at para. 64–68). The reference purportedly discloses particular methods of crosslinking.

U.S. Pat. No. 5,260,351 purportedly discloses perfluoroelastomers cured by radiation in the absence of curing agents. The reference purportedly relates to curing of fully fluorinated polymers, such as those prepared from tetrafluoroethylene, a perfluoralkyl perfluorovinyl ether, and cure site or crosslinking units providing at least one of nitrile, perfluorophenyl, bromine or iodine in the resulting terpolymer.

SUMMARY OF THE INVENTION

Briefly, the present invention provides a method of making a crosslinked polymer comprising the steps of: a) providing a highly fluorinated fluoropolymer comprising: a backbone derived in part from tetrafluoroethylene monomer, first pendent groups which include a group according to the formula —$SO_2X$, where X is F, Cl, Br, OH or —$O^{31}$ $M^+$, where $M^+$ is a monovalent cation, and second pendent groups which include Br, Cl or I, typically Br; and b) exposing said fluoropolymer to ultraviolet radiation so as to result in the formation of crosslinks. The method may additionally comprise, prior to said step b), the step of: c) forming the fluoropolymer into a membrane. Typically, the membrane has a thickness of 90 microns or less, more typically 60 or less, and most typically 30 microns or less. Typically the highly fluorinated fluoropolymer is perfluorinated. Typically the first pendent groups are groups according to the formula —O—$(CF_2)_4$—$SO_2X$, and typically X is OH.

In another aspect, the present invention provides crosslinked polymers and polymer electrolyte membranes made according to any of the methods of the present invention.

What has not been described in the art, and is provided by the present invention, is a method of crosslinking highly fluorinated fluoropolymer comprising a backbone derived in part from tetrafluoroethylene monomer, first pendent groups which include a group according to the formula —$SO_2X$, where X is F, Cl, Br, OH or —$O^-M^+$, where $M^+$ is a monovalent cation, and second pendent groups which include Br, Cl or I, which is typically a membrane for use as a polymer electrolyte membrane, using ultraviolet radiation.

In this application:

"ultraviolet radiation" means electromagnetic radiation in the range of wavelengths beginning at 400 nm, or more typically 380 nm, or more typically 300 nm, and extending downward, typically to 180 nm;

"equivalent weight" (EW) of a polymer means the weight of polymer which will neutralize one equivalent of base;

"hydration product" (HP) of a polymer means the number of equivalents (moles) of water absorbed by a membrane per equivalent of sulfonic acid groups present in the membrane multiplied by the equivalent weight of the polymer; and "highly fluorinated" means containing fluorine in an amount of 40 wt % or more, typically 50 wt % or more and more typically 60 wt % or more.

DETAILED DESCRIPTION

The present invention provides a method of making a crosslinked polymer. The polymer to be crosslinked comprises: a backbone derived in part from tetrafluoro-ethylene (TFE) monomer, first pendent groups which include a group according to the formula —$SO_2X$, where X is F, Cl, Br, OH or —$O^-M^+$, where $M^+$ is a monovalent cation, and second pendent groups which include Br, Cl or I. Such polymers may be useful in the manufacture of polymer electrolyte membranes (PEM's), such as are used in electrolytic cells such as fuel cells.

PEM's manufactured from the crosslinked polymer according to the present invention may be used in the fabrication of membrane electrode assemblies (MEA's) for use in fuel cells. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. Gas diffusion layers (GDL's) facilitate gas transport to and from the anode and cathode electrode materials and conduct electrical current. The GDL may also be called a fluid transport layer (FTL) or a diffuser/current collector (DCC). The anode and cathode electrode layers may be applied to GDL's in the form of a catalyst ink, and the resulting coated GDL's sandwiched with a PEM to form a five-layer MEA. Alternately, the anode and cathode electrode layers may be applied to opposite sides of the PEM in the form of a catalyst ink, and the resulting catalyst-coated membrane (CCM) sandwiched with two GDL's to form a five-layer MEA. The five layers of a five-layer MEA are, in order: anode GDL, anode electrode layer, PEM, cathode electrode layer, and cathode GDL. In a typical PEM fuel cell, protons are formed at the anode via hydrogen oxidation and transported across the PEM to the cathode to react with oxygen, causing electrical current to flow in an external circuit connecting the electrodes. The PEM forms a durable, non-porous, electrically non-conductive mechanical barrier between the reactant gases, yet it also passes H$^+$ ions readily.

The polymer to be crosslinked comprises a backbone, which may be branched or unbranched but is typically unbranched. The backbone is highly fluorinated and more typically perfluorinated. The backbone comprises units derived from tetrafluoroethylene (TFE), i.e., typically —CF$_2$—CF$_2$— units, and units derived from co-monomers, typically including at least one according to the formula CF$_2$=CY—R where Y is typically F but may also be CF$_3$, and where R is a first pendent group which includes a group according to the formula —SO$_2$X, where X is F, Cl, Br, OH, or —O$^-$M$^+$, where M$^+$ is a monovalent cation, typically an alkali metal cation such as Na$^+$. X is most typically OH. In an alternative embodiment, first side groups R may be added to the backbone by grafting. Typically, first side groups R are highly fluorinated and more typically perfluorinated. R may be aromatic or non-aromatic. Typically, R is —R$^1$—SO$_2$X, where R$^1$ is a branched or unbranched perfluoroalkyl, perfluoroalkoxy, or perfluoropolyether group comprising 1–15 carbon atoms and 0–4 oxygen atoms. R$^1$ is typically —O—R$^2$— wherein R$^2$ is a branched or unbranched perfluoroalkyl, perfluoroalkoxy, or perfluoropolyether group comprising 1–15 carbon atoms and 0–4 oxygen atoms. R$^1$ is more typically —O—R$^3$— wherein R$^3$ is a perfluoroalkyl group comprising 1–15 carbon atoms. Examples of R$^1$ include:

—(CF$_2$)$_n$— where n is 1, 2, 3, 4, 5, 6, 7, 8, 9, 10, 11, 12, 13, 14 or 15

(—CF$_2$CF(CF$_3$)—)$_n$ where n is 1, 2, 3, 4, or 5

(—CF(CF$_3$)CF$_2$—)$_n$ where n is 1, 2, 3, 4, or 5(—CF$_2$CF(CF$_3$)—)$_n$—CF$_2$— where n is 1, 2, 3 or 4

(—O—CF$_2$CF$_2$—)$_n$ where n is 1, 2, 3, 4, 5, 6 or 7

(—O—CF$_2$CF$_2$CF$_2$—)$_n$ where n is 1, 2, 3, 4, or 5

(—O—CF$_2$CF$_2$CF$_2$CF$_2$—)$_n$ where n is 1, 2 or 3

(—O—CF$_2$CF(CF$_3$)—)$_n$ where n is 1, 2, 3, 4, or 5

(—O—CF$_2$CF(CF$_2$CF$_3$)—)$_n$ where n is 1, 2 or 3

(—O—CF(CF$_3$)CF$_2$—)$_n$ where n is 1, 2, 3, 4 or 5

(—O—CF(CF$_2$CF$_3$)CF$_2$—)$_n$ where n is 1, 2 or 3

(—O—CF$_2$CF(CF$_3$)—)$_n$—O—CF$_2$CF$_2$— where n is 1, 2, 3 or 4

(—O—CF$_2$CF(CF$_2$CF$_3$)—)$_n$—O—CF$_2$CF$_2$— where n is 1, 2 or 3

(—O—CF(CF$_3$)CF$_2$—)$_n$—O—CF$_2$CF$_2$— where n is 1, 2, 3 or 4

(—O—CF(CF$_2$CF$_3$)CF$_2$—)$_n$—O—CF$_2$CF$_2$— where n is 1, 2 or 3

—O—(CF$_2$)$_n$— where n is 1, 2, 3, 4, 5, 6, 7, 8, 9, 10, 11, 12, 13 or 14

R is typically —O—CF$_2$CF$_2$CF$_2$CF$_2$—SO$_2$X or —O—CF$_2$—CF(CF$_3$)—O—CF$_2$—CF$_2$—SO$_2$X and most typically —O—CF$_2$CF$_2$CF$_2$CF$_2$—SO$_2$X, where X is F, Cl, Br, OH, or —O$^-$M$^+$, but most typically OH.

The fluoromonomer providing first side group R may be synthesized by any suitable means, including methods disclosed in U.S. Pat. No. 6,624,328.

In addition, the fluoropolymer includes second pendent groups Q containing Br, Cl or I, typically Br. The second pendent group may be derived from a co-monomer according to the formula CF$_2$=CY-Q where Y is typically F but may also be CF$_3$, and where Q is a second pendent group which includes Br, Cl or I. In an alternative embodiment, second pendent groups Q may be added to the backbone by grafting. Typically, second pendent groups Q are highly fluorinated and more typically perfluorinated, other than at the bromine position. Typically, Q is —R$^1$—Br, where R$^1$ is as described above. Alternately, Q is Br, Cl or I, typically Br.

The overall Cl, Br or I content is typically 0.05–5 wt % and more typically 0.1–2 wt %.

Most typically, the fluoropolymer is a terpolymer of TFE, CF$_2$=CY—R as described above, and CF$_2$=CY-Q as described above.

The polymer to be crosslinked may be made by any suitable method, including emulsion polymerization, extrusion polymerization, polymerization in supercritical carbon dioxide, solution or suspension polymerization, and the like, which may be batchwise or continuous.

In one embodiment, chain transfer agents may be used during polymerization to provide a polymer with Cl, Br or I end groups. Where such end groups are present, they may be considered pendant groups for the purposes of the present invention. Examples of chain transfer agents include those having the formula RX$_n$, wherein R is an n-valent alkyl group containing 1–12 carbon atoms, which may be fluorinated or unfluorinated, and wherein X's are independently selected from Cl, Br or I. Additional chain transfer agents are exemplified in U.S. Pat. Nos. 4,000,356 and 6,380,337, incorporated herein by reference. In addition, the polymerization can be performed in the presence of Br$^-$ or I$^-$ salts in order to introduce terminal Br or I endgroups, as described in EP 407 937, incorporated herein by reference.

The acid-functional pendent groups typically are present in an amount sufficient to result in an hydration product (HP) of greater than 15,000, more typically greater than 18,000, more typically greater than 22,000, and most typically greater than 25,000. In general, higher HP correlates with higher ionic conductance.

The acid-functional pendent groups typically are present in an amount sufficient to result in an equivalent weight (EW) of less than 1200, more typically less than 1100, and more typically less than 1000, and more typically less than 900.

In one embodiment of the present invention, the polymer is brought into contact with a crosslinking agent prior to crosslinking. Any suitable crosslinking agent may be used, such that it will react with at least two radicals generated by removal of Cl, Br or I from a pendent group. Crosslinking agents which may be useful in the practice of the present invention may include polyaromatic species or polyvinyl species, which may be non-fluorinated or fluorinated to a low level but which are more typically highly fluorinated and more typically perfluorinated. Examples of crosslinking agents useful in the practice of the present invention include: trimethylol propyl triacrylate (TMPTA), diphenyl ethers, diphenoxy alkanes, diphenoxy ethers, diphenoxy polyethers, di-, tri- and tetraallyl species, and the like. The crosslinking agent and polymer may be mixed by any suitable method, including mixing in solution or suspension, kneading, milling, or the like. Alternately, the crosslinking agent may be added to a formed membrane, e.g. by immersion of the membrane in a solution of the crosslinking agent. The crosslinking agent may be added in any suitable amount relative to the number of first pendent groups. If an excess of crosslinking agent is added, the excess may be removed after crosslinking. Alternately, if the crosslinking agent is added in a less than an equimolar amount, it is expected that only a portion of the crosslinks formed will be through molecules of the crosslinking agent.

In one embodiment of the present invention, the polymer or polymer/crosslinking agent blend is formed into a membrane prior to crosslinking. Any suitable method of forming the membrane may be used. The polymer is typically cast from a suspension or solution. Any suitable casting method may be used, including bar coating, spray coating, slit coating, brush coating, and the like. Alternately, the membrane may be formed from neat polymer in a melt process such as extrusion. After forming, the membrane may be annealed. Typically the membrane has a thickness of 90 microns or less, more typically 60 microns or less, and most typically 30 microns or less. A thinner membrane may provide less resistance to the passage of ions. In fuel cell use, this results in cooler operation and greater output of usable energy. Thinner membranes must be made of materials that maintain their structural integrity in use.

In a further embodiment, the polymer may be imbibed into a porous supporting matrix prior to crosslinking, typically in the form of a thin membrane having a thickness of 90 microns or less, more typically 60 microns or less, and most typically 30 microns or less. Any suitable method of imbibing the polymer into the pores of the supporting matrix may be used, including overpressure, vacuum, wicking, immersion, and the like. The polymer becomes embedded in the matrix upon reaction of the amidine groups. Any suitable supporting matrix may be used. Typically the supporting matrix is electrically non-conductive. Typically, the supporting matrix is composed of a fluoropolymer, which is more typically perfluorinated. Typical matrices include porous polytetrafluoroethylene (PTFE), such as biaxially stretched PTFE webs. Additional embodiments may be found in U.S. Pat. Nos. RE37,307, RE37,656, RE37,701, and 6,254,978, the disclosures of which are incorporated herein by reference.

An effective amount of one or more photoinitiators may be added to the polymer or the membrane at any suitable stage, such as during membrane formation. Any suitable UV photoinitiator may be used, including benzylketals such as Irgacure™ 651, alpha hydroxyketones such as Irgacure™ 2959, BAPO-type photoinitiators such as Irgacure™ 819, diaryliodonium salts, triarylsulfonium salts, azo compounds, peroxides, and the like. Such initiators include benzophenone and its derivatives; benzoin, α-methylbenzoin, α-phenylbenzoin, α-allylbenzoin, α-benzylbenzoin; benzoin ethers such as benzil dimethyl ketal ((commercially available under the trade designation "IRGACURE 651" from Ciba-Geigy of Ardsley, N.Y.), benzoin methyl ether, benzoin ethyl ether, benzoin n-butyl ether; acetophenone and its derivatives such as 2-hydroxy-2-methyl-1-phenyl-1-propanone (commercially available under the trade designation "DAROCUR 1173" from Ciba-Geigy of Ardsley, N.Y.) and 1-hydroxycyclohexyl phenyl ketone (HCPK) (commercially available under the trade designation "IRGACURE 184", also from Ciba-Geigy Corporation); 2-methyl-1-[4-(methylthio)phenyl]-2-(4-morpholinyl)-1-propanone commercially available under the trade designation "IRGACURE 907", also from Ciba-Geigy Corporation); 2-benzyl-2-(dimethlamino)-1-[4-(4-morpholinyl)phenyl]-1-butanone commercially available under the trade designation "IRGACURE 369", also from Ciba-Geigy Corporation). Other useful photoinitiators include pivaloin ethyl ether, anisoin ethyl ether; anthraquinones such as anthraquinone, 2-methylanthraquinone, 2-ethyl anthraquinone, 2-t-butyl anthraquinone, 1-chloroanthraquinone, 2-bromoanthraquinone, 2-nitroanthraquinone, anthraquinone-1-carboxaldehyde, anthraquinone-2-thiol, 4-cyclohexylanthraquinone, 1,4-dimethylanthraquinone, 1-methoxyanthraquinone, benzathraquinonehalomethyl triazines; onium salts, for example, diazonium salts such as phenyldiazoniumhexafluorophosphate and the like; diaryliodonium salts such as ditolyliodonium hexafluoroantimonate and the like, sulfonium salts such as triphenylsulfonium tetrafluoroborate and the like; titanium complexes such as are commercially available under the trade designation "CGI 784 DC", also from Ciba-Geigy Corporation); uranyl salts such as uranyl nitrate, uranyl propionate; halomethylnitrobenzenes such as 4-bromomethylnitrobenzene and the like; mono- and bis-acylphosphines such as those available from Ciba-Geigy under the trade designations "IRGACURE 1700", "IRGACURE 1800", "IRGACURE 1850" and "DAROCUR 4265".

The step of crosslinking comprises the step of exposing the fluoropolymer to ultraviolet radiation so as to result in the formation of crosslinks. Any suitable apparatus and UV source may be used, including arc lamps, microwave powered lamps, mercury lamps, gallium lamps, lasers, sun lamps, and the like. Typically, the UV radiation is at wavelengths between 300 and 180 nm, and more typically between 280 and 200 nm. Typically, the UV radiation is in a dose of 1 mJ/cm$^2$ or more, more typically 5 mJ/cm$^2$ or more, more typically 10 mJ/cm$^2$ or more, and most typically 50 mJ/cm$^2$ or more. A continuous process of exposure may be used to treat roll good membranes.

It will be understood that polymers and membranes made according to the method of the present invention may differ in chemical structure from those made by other methods, in the structure of crosslinks, the placement of crosslinks, the placement of acid-functional groups, the presence or absence of crosslinks on pendent groups or of acid-functional groups on crosslinks, and the like.

This invention is useful in the manufacture of strengthened polymer electrolyte membranes for use in electrolytic cells such as fuel cells.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, Wis., or may be synthesized by known methods.

Polymer

The polymer electrolyte used in the present examples was made by emulsion co-polymerization of tetrafluoroethylene (TFE) with $CF_2=CF-O-(CF_2)_4-SO_2F$ (MV4S), which was synthesized by the method disclosed in U.S. Pat. No. 6,624,328, the disclosure of which is incorporated herein by reference, and with $CF_2=CF-O-(CF_2)_2-Br$(MV2Br).

130 g MV4S was preemulsified in water with 15 g APFO emulsifier (ammonium perfluorooctanoate, $C_7F_{15}COONH_4$) under high shear (24,000 rpm), using an ULTRA-TURRAX® Model T 25 disperser S25KV-25F (IKA-Werke GmbH & Co. KG, Staufen, Germany) for 2 min. A 4 liter polymerization kettle equipped with an impeller agitator system was charged with 3.1 kg deionized water. The kettle was heated up to 50° C. and then the preemulsion was charged into the oxygen-free polymerization kettle. At 50° C. the kettle was further charged with 6 g MV2Br and 178 g gaseous tetrafluoroethylene (TFE) to 8 bar absolute reaction pressure. At 50° C. and 240 rpm agitator speed the polymerization was initiated by addition of 15 g sodium disulfite and 40 g ammonium peroxodisulfate. During the course of the reaction, the reaction temperature was maintained at 50° C. Reaction pressure was maintained at 8.0 bar absolute by feeding additional TFE into the gas phase. A second portion of MV4S-preemulsion was prepared in the same manner and proportions described above, using 427 g MV4S. The second preemulsion portion was fed into the liquid phase during the course of the reaction continuously. An additional 26 g MV2Br was also continuously fed into the reactor during the course of the reaction.

After feeding 800 g TFE, the monomer valve was closed and the monomer feed interrupted. The continuing polymerization reduced the pressure of the monomer gas phase to 2.9 bar. At that time, the reactor was vented and flushed with nitrogen gas. The resulting polymer had an MV4S-content of 25.8 mol % and 1.2 mol % of MV2-Br; the MFI (265/5 kg) was 4.1 g/10 min.

The polymer dispersion thus obtained was mixed with 3 equivalents of LiOH and 2 equivalents of $Li_2CO_3$ (based on sulfonyl fluoride concentration) and enough water to make a 20% polymer solids mixture. This mixture was heated to 250° C. for four hours. Most (>95%) of the polymer became dispersed under these conditions. The dispersions were filtered to remove LiF and undispersed polymer, and then ion exchanged on Mitsubishi Diaion SKT10L ion exchange resin to give the acid form of the ionomer. The resulting polymer electrolyte is a perfluorinated polymer with acidic side chains according to the formula: —O—$(CF_2)_4$—$SO_3H$ and side chains according to the formula —O—$(CF_2)_2$—Br. The resulting mixture was an acid dispersion at 18 to 19% polymer solids. This dispersion was concentrated in vacu to about 38% solids and then mixed with n-propanol to give the desired 20% solids dispersion in a water/n-propanol solvent mixture of about 40% water/60% n-propanol. This base dispersion was used to cast membranes.

Various modifications and alterations of this invention will become apparent to those skilled in the art without departing from the scope and principles of this invention, and it should be understood that this invention is not to be unduly limited to the illustrative embodiments set forth hereinabove.

We claim:

1. A method of making a crosslinked polymer comprising the steps of:
   a) providing a highly fluorinated fluoropolymer comprising: a backbone derived in part from tetrafluoroethylene monomer, first pendent groups which include a group according to the formula —$SO_2X$, where X is F, Cl, Br, OH or —$O^-M^+$, where $M^+$ is a monovalent cation, and second pendent groups which include Br; and
   b) exposing said fluoropolymer to ultraviolet radiation so as to result in the formation of crosslinks.

2. The method according to claim 1 wherein said method additionally comprises, prior to said step b), the step of:
   c) forming said fluoropolymer into a membrane.

3. The method according to claim 2 wherein said membrane has a thickness of 90 microns or less.

4. The method according to claim 1 wherein said highly fluorinated fluoropolymer is perfluorinated.

5. The method according to claim 1 wherein said pendent groups are according to the formula —$R^1$—$SO_2X$, where $R^1$ is a branched or unbranched perfluoroalkyl or perfluoroether group comprising 1–15 carbon atoms and 0–4 oxygen atoms, and where X is F, Cl, Br, OH or —$O^-M^+$, where $M^+$ is a monovalent cation.

6. The method according to claim 1 wherein said pendent groups are groups according to the formula —O—$(CF_2)_4$—$SO_2X$, where X is F, Cl, Br, OH or —$O^-M^+$, where $M^+$ is a monovalent cation.

7. The method according to claim 1 wherein said pendent groups are groups according to the formula —O—$(CF_2)_4$—$SO_3H$.

8. The method according to claim 2 wherein said pendent groups are according to the formula —$R^1$—$SO_2X$, where $R^1$ is a branched or unbranched perfluoroalkyl or perfluoroether group comprising 1–15 carbon atoms and 0–4 oxygen atoms, and where X is F, Cl, Br, OH or —$O^-M^+$, where $M^+$ is a monovalent cation.

9. The method according to claim 2 wherein said pendent groups are groups according to the formula —O—$(CF_2)_4$—$SO_2X$, where X is F, Cl, Br, OH or —$O^-M^+$, where $M^+$ is a monovalent cation.

10. The method according to claim 2 wherein said pendent groups are groups according to the formula —O—$(CF_2)_4$—$SO_3H$.

11. The method according to claim 3 wherein said pendent groups are according to the formula —$R^1$—$SO_2X$, where $R^1$ is a branched or unbranched perfluoroalkyl or perfluoroether group comprising 1–15 carbon atoms and 0–4 oxygen atoms, and where X is F, Cl, Br, OH or —$O^-M^+$, where $M^+$ is a monovalent cation.

12. The method according to claim 3 wherein said pendent groups are groups according to the formula —O—$(CF_2)_4$—$SO_2X$, where X is F, Cl, Br, OH or —$O^-M^+$, where $M^+$ is a monovalent cation.

13. The method according to claim 3 wherein said pendent groups are groups according to the formula —O—$(CF_2)_4$—$SO_3H$.

14. The method according to claim 2 wherein step c) comprises imbibing said fluoropolymer into a porous supporting matrix.

15. The method according to claim 14 wherein said porous supporting matrix is a porous polytetrafluoroethylene web.

16. The method according to claim 1 wherein said method additionally comprises, prior to said step b), the step of:
   d) contacting said polymer with a crosslinking agent.

* * * * *

UNITED STATES PATENT AND TRADEMARK OFFICE
CERTIFICATE OF CORRECTION

PATENT NO. : 7,060,738 B2
APPLICATION NO. : 10/733211
DATED : June 13, 2006
INVENTOR(S) : Naiyong Jing It is certified that error appears in the above-identified patent and that said Letters Patent is hereby corrected as shown below:

Page 1, (56) References Cited, U.S. Patent Documents;
Line 11; delete " Frosch et al. "
and insert -- Rosser et al. -- therefore.

Page 1, (57) Abstract,
Line 7; delete " tetrafluoro-ethylene "
and insert -- tetrafluoroethylene -- therefore.

Page 2, (56) References Cited, U.S. Patent Documents;
Line 1; delete " 6,355,370 B1 "
and insert -- 6,355,370 B2 -- therefore.
Line 12; delete " 6,552,135 B1 "
and insert -- 6,552,135 B2 -- therefore.
Line 14; delete " 6,649,703 B1 "
and insert -- 6,649,703 B2 -- therefore.
Line 15; delete " 6,667,377 B1 "
and insert -- 6,667,377 B2 -- therefore.
Line 17; delete " 6,872,781 B1 "
and insert -- 6,872,781 B2 -- therefore.

Column 1
Line 51; delete " —$O^{31}$ $M^+$ " and insert -- $-O^- M^+$ -- therefore.

Column 2
Line 29; delete " tetrafluoro-ethylene "
and insert -- tetrafluoroethylene -- therefore.

UNITED STATES PATENT AND TRADEMARK OFFICE
CERTIFICATE OF CORRECTION

PATENT NO. : 7,060,738 B2
APPLICATION NO. : 10/733211
DATED : June 13, 2006
INVENTOR(S) : Naiyong Jing It is certified that error appears in the above-identified patent and that said Letters Patent is hereby corrected as shown below:

<u>Column 4</u>
Line 28; delete " result in an " and insert -- result in a -- therefore.

Signed and Sealed this

Thirty-first Day of July, 2007

JON W. DUDAS
*Director of the United States Patent and Trademark Office*